June 17, 1947.　　　　S. SCHNELL　　　　2,422,370
BRAKE CONTROL SYSTEM
Filed March 6, 1944　　　　2 Sheets-Sheet 2
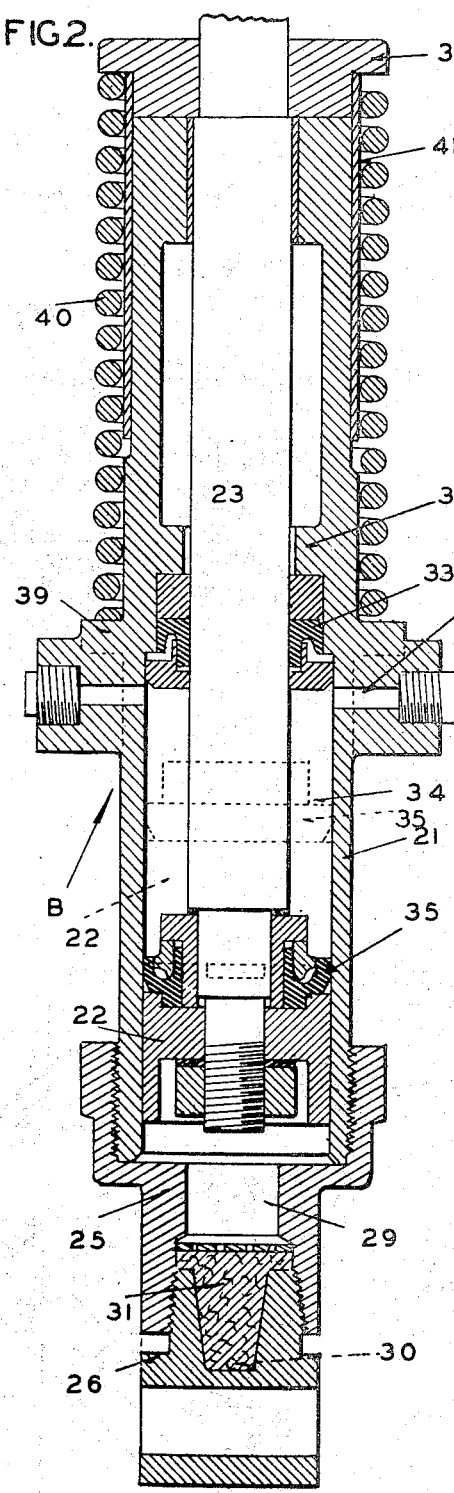
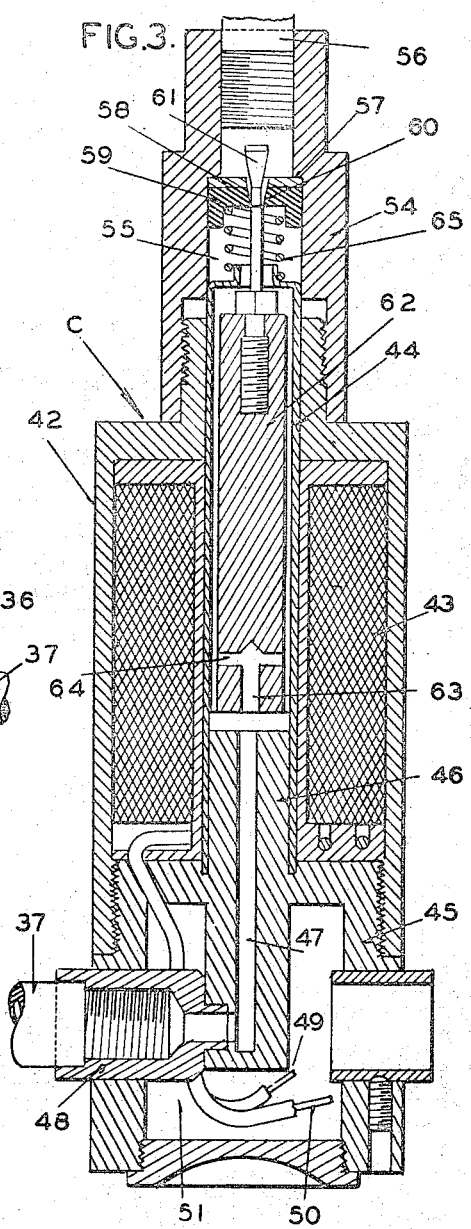
INVENTOR
STEVE SCHNELL
BY
ATTORNEY Patented June 17, 1947

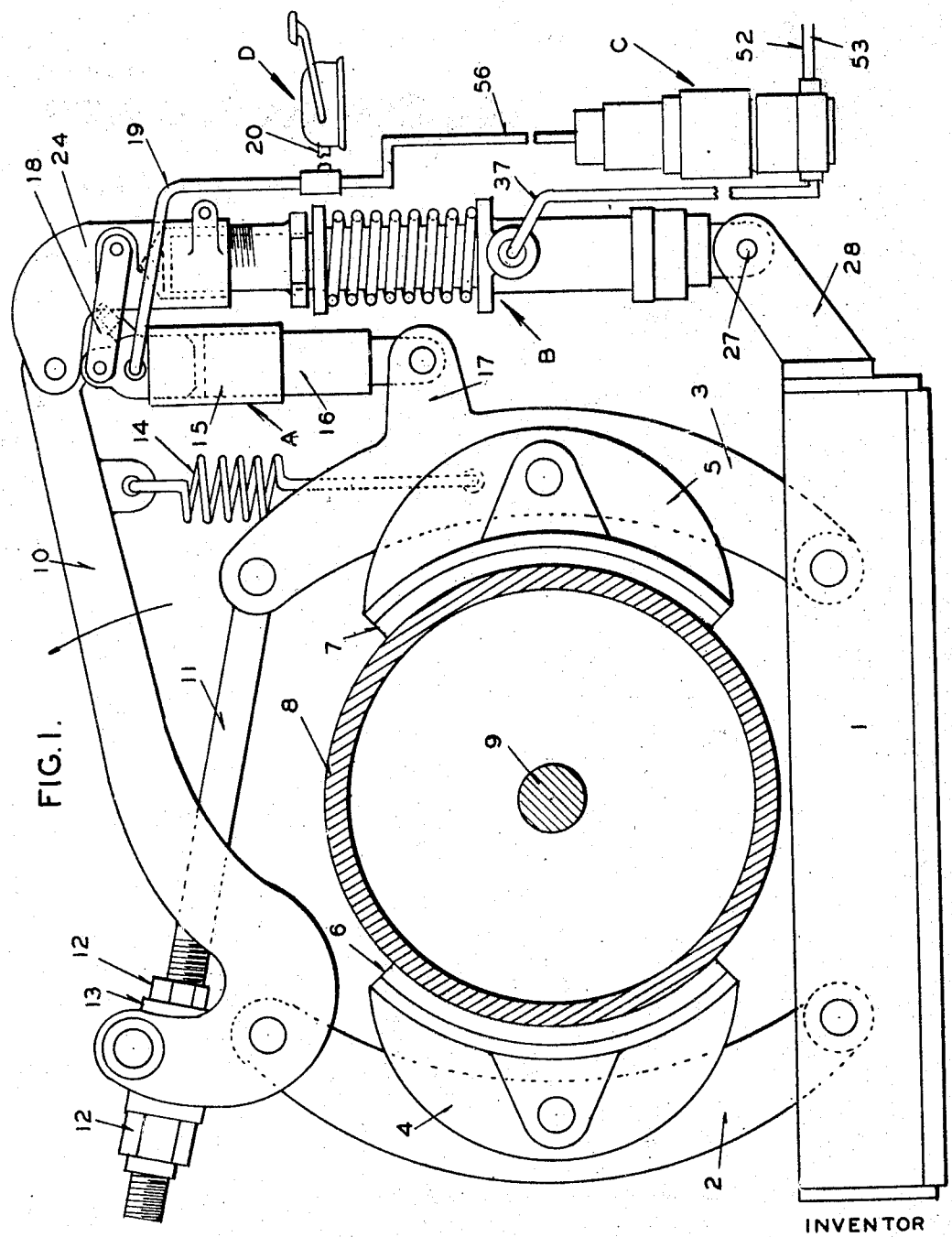

2,422,370

UNITED STATES PATENT OFFICE 2,422,370

BRAKE CONTROL SYSTEM

Steve Schnell, Kirkwood, Mo., assignor to Wagner Electric Corporation, St. Louis, Mo., a corporation of Delaware Application March 6, 1944, Serial No. 525,136

9 Claims. (Cl. 188—151)

My invention relates to brakes and more particularly to a control system for applying and releasing a brake.

One of the objects of my invention is to produce an improved brake control system which can be associated with a brake so that said brake can be held applied by spring pressure under certain conditions and under other conditions can be applied and released by application and release of fluid pressure without interference by the spring pressure.

Another object of my invention is to produce a brake control system of the type described by the use of separate units and thereby facilitate the association of the system with the brake to be controlled.

Still another object of my invention is to provide certain brake control units which when associated with fluid pressure controlled units already being employed in controlling a brake will produce an improved brake control system of the type referred to.

Other objects of my invention will become apparent from the following description taken in connection with the accompanying drawings in which Figure 1 is a view of an industrial brake having a control system embodying my invention associated therewith; Figure 2 is a longitudinal sectional view of the unit embodying the brake applying spring and the fluid pressure motor for compressing it; and Figure 3 is a longitudinal sectional view of the solenoid-operated holding valve unit.

Referring to the drawings in detail and first to Figure 1, numeral 1 indicates a base upon which two levers 2 and 3 carrying brake shoes 4 and 5, respectively, are pivoted. These brake shoes are provided with linings 6 and 7 for cooperation with a drum 8 rotatable with a shaft 9 forming a part of any industrial mechanism, such as a crane, winch, or the like, said shaft being driven by a source of power, such as an electric motor. The upper end of lever 2 has pivoted thereon intermediate its ends a long L-shaped lever 10 extending across the top of the brake assembly. The end of this lever is connected to the upper end of lever 3 by means of a link 11. The link 11 and lever 10 may be adjusted by a suitable mechanism shown as nuts 12 threaded upon link 11 and cooperating with a member 13 forming part of the pivotal connection between link 11 and lever 10. When lever 10 is moved in the direction indicated by the arrow, levers 2 and 3 will be moved toward each other and the brake shoes applied. When lever 10 is moved in the opposite direction, the brake shoes will be released. A light retracting spring 14 is connected between levers 10 and 3 to aid in the release.

The system embodying my invention and employed to control the brake just described comprises a fluid motor unit A for applying the brake by fluid pressure, a combined spring applying and fluid motor controlling unit B, a solenoid-controlled valve unit C, and a source of fluid pressure D which, in this particular instance, is a manually-operated master cylinder device of known construction.

The fluid motor unit A comprises a cylinder 15 in which a piston 16 is reciprocable. The piston is pivotally connected to a projection 17 on lever 3 and cylinder 15 is arranged to abut the outer end of lever 10 being held in proper abutting position by links 18 (one only being shown) which are pivotally connected to a part of unit B. The cylinder is connected by a conduit 19 with the outlet conduit 20 of the master cylinder device D. Thus it is seen that when fluid pressure is developed by the master cylinder device, the cylinder and piston will be moved relatively apart and lever 10 rotated in the direction of the arrow to apply the brakes. When fluid pressure is released by the master cylinder device, the retracting spring 14 will release the brake shoes. The fluid motor unit A is the same unit as now being employed to apply and release industrial brakes. However, the cylinder is not connected directly to lever 10, as is present practice, but is arranged to be in abutting relation as described in order to permit lever 10 to be operated without any movement of cylinder 15 of unit A.

Referring now to both Figures 1 and 2, the combined spring applying and fluid motor controlling unit B will be described in detail. This unit comprises a cylinder 21 having a piston 22 therein to which is connected a piston rod 23. The piston rod extends out of the upper end of the cylinder where it is connected to the outer end of lever 10 by a connecting member 24, this connecting member being the part to which the links 18 are connected. The lower end of the cylinder is closed by a cap 25 in which is screwed a bearing plug 26 for pivotally mounting the lower end of the cylinder on a pin 27 carried by a bracket 28 on the base of the brake. The lower end of the cylinder ahead of the piston is in communication with the atmosphere by way of a passage 29 and a small drilled hole 30 in the plug. Associated with the passage 29 is an air cleaner 31.

Intermediate its end the cylinder is formed with a partition 32 through which the rod 23 extends.

Associated with this partition and the rod is a packing 33 for sealing the rod and providing a sealed chamber 34 between the partition and piston 22, said piston also having a packing 35 for sealing purposes. The chamber has an inlet 36 to which is connected a conduit 37 coming from the solenoid-controlled valve unit C.

The rod 23 above the cylinder has secured thereto a collar 38 which is so positioned on the rod as to abut the upper end of cylinder 21 when the piston approaches the lower end of the cylinder. Interposed between this collar and an annular shoulder 39 on the exterior of cylinder 21 is a strong coil spring 40 in surrounding relation to the upper end of the cylinder. Thus this spring acts to force the piston rod upwardly and to apply the brake. A sleeve 41 is secured to collar 38 and telescopes over the end of the cylinder in order to provide protection for the rod bearing in the upper end of the cylinder whenever the rod is moved upwardly.

If no fluid under pressure is in chamber 34 of the unit B, spring 40 can expand from the position shown in Figures 1 and 2 and as a result thereof, move piston rod 23 upwardly and apply the brake and maintain it applied by the force which is exerted by the spring. In the event sufficient fluid under pressure should be introduced into chamber 34, it will cause movement of piston 22 downwardly, thereby compressing spring 40 to the position shown in Figures 1 and 2 and releasing the brake. If the fluid under pressure in chamber 34 should be trapped therein, the brake will continue to be maintained in released condition.

Referring now to Figure 3, the solenoid-controlled valve unit has for its purpose the trapping of fluid under pressure in chamber 34 of the unit B under certain conditions. This unit C comprises a cylindrical casing 42 in which is mounted the coil 43 of the solenoid, this coil being in surrounding relation to a tubular element 44 extending through the center of the casing. The lower end of the casing is closed by a plug 45 which has an extension 46 extending into the tubular element 44, said extension being formed with a passage 47 which leads to a connector element 48 which connects said passage with the previously referred to conduit 37 which is connected to unit B. The terminals 49 and 50 of the coil extend into a chamber 51 in plug 45 and from there they are connected to the conductors 52 and 53 (Figure 1) which in turn are connected to the circuit for the motor which drives shaft 9 and carries the brake drum 8 of the brake.

The upper end of casing 42 has threaded thereon a secondary casing 54 which has a cylindrical chamber 55 connected with a conduit 56 leading to the outlet conduit 20 of the master cylinder device D. In chamber 55 is an annular shoulder 57 with which cooperates an annular rigid disc 58 forming the backing for an annular packing element 59 provided with a conical central passage 60. Cooperating with this annular passage is a conical valve element 61 connected to the armature 62 of the solenoid, said armature being positioned within the tubular element 44 and being slightly smaller in diameter in order to provide a space for flow of fluid through the tubular element. The lower end of the armature member is provided with an axial passage 63 communicating with a cross passage 64 in order that fluid can flow from passage 47 to the tubular element when the armature 62 of the solenoid is pulled downwardly into engagement with the extension 47 as the result of energization of the coil 43. When energization takes place, the conical valve element will be pulled down and engaged with the conical passage through the sealing element 59 to thus close off communication between chamber 55 and conduit 56 so that fluid can be trapped in chamber 34 of unit B. A spring 65 normally biases the packing element and the annular disc against the shoulder 57. When seated by the movement of armature 62 of the solenoid, the conical valve 61 will pick up the annular disc and move it slightly away from shoulder 57. Thus there is provided a yieldable valve seat which will permit the armature of the solenoid to always be brought into abutment with extension 46 to permit maximum holding power of the solenoid whenever the valve is to be held closed. When the valve element is seated, it will prevent fluid from flowing therepast in the direction of the master cylinder device. It will not, however, prevent fluid from flowing in the opposite direction as fluid under pressure can move the packing element 59 slightly downwardly and thus allow fluid to pass the valve element.

Referring to the operation of the control system, the parts thereof will be in the positions shown in Figure 1 when the circuit with which the solenoid-controlled valve unit C is associated is opened and no fluid pressure is being developed by the master cylinder device. The open condition of the valve unit C is shown in Figure 3. With the valve open, no fluid will be trapped in chamber 34 of the combined spring applying and fluid motor controlling unit D and consequently, the strong spring 40 can expand and apply pressure to lever 10 to apply the brakes. When the brakes are applied by spring 40, piston 22 will be in the position shown in dotted lines in Figure 2. Since the circuit for the valve unit C is intended to be associated with a main circuit of an electric motor of the industrial apparatus with which the brake is to be used, then the main circuit will also be open and the electric motor operated parts of the industrial apparatus will be held braked. When the main circuit of the electric motor is closed, the solenoid circuit of the valve unit C will also be closed and thus the valve element 61 moved to closed position.

In order to release the brakes when the solenoid is energized all that is necessary is to operate the master cylinder device D and force fluid pressure into conduits 19 and 56. Fluid pressure entering the fluid motor A will be effective to continue to hold the brakes applied. The fluid pressure which enters conduit 56 will be forced past the valve element 61 (the cup 59 being forced away from the valve element against the action of the light spring 65) and thus flow through the valve unit C to chamber 34 of unit B and become effective on piston 22. This will cause the piston 22 to be moved downwardly to the position shown in full lines in Figure 2, thereby compressing the strong spring 40 and releasing its force from lever 10. All the fluid under pressure forced into chamber 34 will be trapped since it cannot return through the valve unit C as long as the solenoid is energized. Thus the strong spring 40 will be held in a depressed condition when the master cylinder device is released. Upon release of the master cylinder device fluid from the fluid motor A will be released and consequently, all pressure acting on lever 10 to hold the brakes applied will also be released. Retracting spring 14 is now effective to release the brakes.

When the brake applying force of the strong spring 40 is nullified, the brakes may be applied and released at will by merely operating the master cylinder device. Whenever fluid pressure is developed by the master cylinder device, the fluid motor A will be operated and the brakes applied. When the master cylinder device is released, the brakes will be permitted to be released by the retracting spring 14. Whenever the operator should again open the main circuit with which the solenoid circuit of the valve unit C is associated, the solenoid 43 will become de-energized and the valve element 61 unseated. This will release the trapped fluid pressure in chamber 34 of the unit B and permit the strong spring 40 to expand and apply force to lever 10 to apply the brakes. Thus whenever the operator should leave the apparatus, such as a crane, and pull the main switch, he will be sure that the brakes will be automatically applied and held applied by a strong spring pressure. The brakes will always remain applied as long as the solenoid remains de-energized and regardless of the operation of the master cylinder device since, whenever the master cylinder device is operated, the strong spring 40 will be compressed but simultaneously therewith fluid under pressure will be admitted to the fluid motor A and cause it to act to hold the brakes applied.

By the use of the various units the present industrial brake which is actuated only by the fluid motor A, for example, may be readily modified so as to provide for the automatic spring application of the brakes whenever the main electric motor circuit of an industrial apparatus is opened. The unit B may be easily attached to the support 1 and lever 10 and the motor A arranged to abut lever 10 and held in abutting relation by the links 18. The solenoid-controlled valve unit C may be placed in any accessible space and connected to the master cylinder device and unit B by the conduits 56 and 37.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In a brake controlling system, a brake, a fluid motor unit for actuating the brake, a source of fluid pressure connected to the motor, a combined spring and fluid motor unit separate from the first named fluid motor unit, said last named unit having its spring connected to transmit a brake applying force to the brake and its fluid motor so associated with the spring that upon operation thereof the spring will be conditioned so that its force cannot be transmitted to apply the brake, conduit means connecting the fluid motor of the unit to the pressure source, and a solenoid-controlled valve unit separate from the other units and associated with conduit means for trapping fluid under pressure in the motor of the combined spring and motor unit.

2. In combination with a brake having a brake applying lever and control means therefor comprising a fluid motor connected to the lever and a source of fluid pressure for controlling the motor, a combined spring and fluid motor unit associated with the lever, said unit being arranged to have its spring act on the lever to apply the brake and its motor when operated to disable the brake applying action of the spring, conduit means for connecting the motor with the source of fluid pressure so as to be actuated by fluid under pressure therefrom, and a controlling valve unit separate from the first unit and interposed in the conduit means, said valve unit comprising a valve means when closed for permitting fluid under pressure to flow to the motor of the first unit and actuate it to disable the spring but preventing return flow of fluid and means for holding the valve means closed.

3. In combination with a brake having a brake applying lever and control means therefor comprising a fluid motor connected to the lever and a source of fluid pressure for controlling the motor, a combined spring and fluid motor unit associated with the lever, said unit being arranged to have its spring act on the lever to apply the brake and its motor when operated to disable the brake applying action of the spring, conduit means for connecting the motor with the source of fluid pressure so as to be actuated by fluid under pressure therefrom, and a solenoid-controlled valve unit interposed in the conduit means, said last named unit comprising a valve element for trapping fluid under pressure in the motor of the first named unit and a solenoid for holding the valve element closed.

4. In a brake controlling system, a brake having a support and an actuating lever, a fluid motor for actuating the brake lever, a source of fluid pressure connected to the motor, a combined spring and fluid motor unit separate from the first named fluid motor, said unit comprising a cylinder connected at one end to the support, a piston in the cylinder, a piston rod extending from the other end of the cylinder and connected to the lever, means forming a fluid-tight chamber in the cylinder on the piston rod side of the piston, and a coiled spring interposed between the cylinder and a shoulder on the piston rod and acting through the piston rod to move the lever to a brake applying position, conduit means connecting the chamber of the unit to the source of fluid pressure so that the piston can be moved to compress the spring, and valve means interposed in the conduit means for trapping fluid under pressure in the chamber.

5. In a brake controlling system, a brake having a support and an actuating lever, a fluid motor for actuating the brake lever, a source of fluid pressure connected to the motor, a combined spring and fluid motor unit separate from the first named fluid motor, said unit comprising a cylinder connected at one end to the support, a piston in the cylinder, a piston rod extending from the other end of the cylinder and connected to the lever, means forming a fluid-tight chamber in the cylinder on the piston rod side of the piston, a coiled spring interposed between the cylinder and a shoulder on the piston rod and acting through the piston rod to move the lever to a brake applying position, conduit means connecting the chamber of the unit to the source of fluid pressure so that the piston can be moved to compress the spring, and a separate controlling valve unit interposed in the conduit means for trapping fluid under pressure in the chamber, said valve unit comprising a yieldable valve seat element, a cooperating movable valve element and a solenoid for holding the movable valve element engaged with the seat element, said movable valve element being arranged to be moved by the solenoid to engage the seat by a movement in the direction of flow of fluid under pressure to the chamber and the yieldable valve seat being capable of movement away from the movable valve element when in seated position by a fluid pressure from the source which is greater than that in the chamber.

6. In a controlling system for a brake having a base support and an actuating lever positioned on the side of the brake opposite the base, a controlling unit interposed between the base and the lever, said unit comprising a cylinder connected at one end to the base, a piston in the cylinder, a piston rod extending from the other end of the cylinder and connected to the lever, means forming a fluid-tight chamber in the cylinder on the piston rod side of the piston, a coiled spring surrounding the piston rod and interposed between the cylinder and a shoulder on the piston rod and acting through the piston rod to move the lever to a brake applying position, a source of fluid pressure, conduit means connecting the chamber of the unit to the source of fluid pressure so that the piston can be moved to compress the spring, and valve means interposed in the conduit means for trapping fluid under pressure in the chamber.

7. In a brake controlling mechanism, a brake; a pressure fluid motor for actuating said brake; a source of pressure fluid to operate said motor; a spring to apply said brake; a second pressure fluid motor operable by said source to compress said spring and release it from said brake; valve means to retain fluid under pressure in said second motor to thereby maintain said spring compressed; a solenoid to close said valve, said valve opening when said solenoid is de-energized thereby allowing said spring to apply said brake; and said first pressure fluid motor normally operating said brake motor when said solenoid is energized.

8. In a brake controlling mechanism, a brake; a pressure fluid motor to actuate said brake; a source of pressure fluid to actuate said motor; a spring to apply said brake, a second pressure fluid motor connectable to said source of pressure fluid to energize said spring; a valve to retain fluid under pressure in said second motor to maintain said spring energized; a solenoid to operate said valve, said valve opened when said solenoid is de-energized and closed when said solenoid is energized; and said first pressure fluid motor normally operating said brake motor whenever said solenoid is energized.

9. In a brake controlling mechanism, a brake; a lever to actuate said brake; a motor to actuate said lever; a source of pressure fluid for said motor; means to form a fluid-tight chamber in said motor; a coil spring associated with said motor to apply force to said lever to thereby apply said brake, said chamber when filled with fluid under pressure energizing said spring to release said brake; valve means to control said fluid-tight chamber; and a solenoid to actuate said valve to closed position, said valve being open when said solenoid is inoperative.

STEVE SCHNELL.

REFERENCES CITED

The following references are of record in the file of this patent:

UNITED STATES PATENTS

| Number | Name | Date |
|---|---|---|
| 2,215,546 | Dick | Sept. 24, 1940 |
| 2,258,784 | McNeal | Oct. 14, 1941 |
| 2,258,756 | Gray | Oct. 14, 1944 |
| 2,211,890 | Farmer | Aug. 20, 1940 |
| 2,282,615 | Spalding | May 12, 1942 |